US012559587B2

(12) United States Patent
Sahouani et al.

(10) Patent No.: US 12,559,587 B2
(45) Date of Patent: Feb. 24, 2026

(54) POLYMER COMPRISING HYDROXY GROUPS AND TERTIARY AMINE GROUPS SUITABLE FOR USE AS A CATALYST

(71) Applicant: 3M INNOVATIVE PROPERTIES COMPANY, St. Paul, MN (US)

(72) Inventors: Hassan Sahouani, Hastings, MN (US); Lalitha V.N.R. Ganapatibhotla, Lake Elmo, MN (US); Heather N. Kinney, Stillwater, MN (US); Jonathan D. Zook, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 544 days.

(21) Appl. No.: 17/283,084

(22) PCT Filed: Nov. 8, 2019

(86) PCT No.: PCT/IB2019/059610
§ 371 (c)(1),
(2) Date: Apr. 6, 2021

(87) PCT Pub. No.: WO2020/104882
PCT Pub. Date: May 28, 2020

(65) Prior Publication Data

US 2021/0340311 A1 Nov. 4, 2021

Related U.S. Application Data

(60) Provisional application No. 62/769,054, filed on Nov. 19, 2018.

(51) Int. Cl.
*C08G 59/68* (2006.01)
*B01J 31/06* (2006.01)
(Continued)

(52) U.S. Cl.
CPC ............ *C08G 59/686* (2013.01); *B01J 31/06* (2013.01); *C08L 33/26* (2013.01); *C08L 63/00* (2013.01); *C08L 81/00* (2013.01)

(58) Field of Classification Search
CPC ...... C08G 59/686; C08G 75/12; C08G 75/04; C08G 75/02; C08G 75/00; C08G 18/04;
(Continued)

(56) References Cited

U.S. PATENT DOCUMENTS

| | | |
|---|---|---|
| 2,466,963 A | 4/1949 | Patrick |
| 2,789,958 A | 4/1957 | Fettes |

(Continued)

FOREIGN PATENT DOCUMENTS

| | | |
|---|---|---|
| CN | 103270073 A | 8/2013 |
| CN | 103347925 A | 10/2013 |

(Continued)

OTHER PUBLICATIONS

Riew, "Rubbery-Modified Thermoset Resins", Advances in Chemistry Series No. 208, American Chemical Society, American Chemical Society, 1984, pp. 1-8.

(Continued)

*Primary Examiner* — Shane Fang
(74) *Attorney, Agent, or Firm* — Carolyn A. Fischer

(57) ABSTRACT

A composition is described comprising an amine-reactive material; and a polymeric catalyst comprising hydroxyl groups and tertiary amine groups. The polymeric catalyst is typically suspended or dispersed in a liquid dispersant. The liquid dispersant does not covalently bond with the tertiary amine groups. The liquid dispersant is typically a hydroxy-functional or thiol-functional. Also described is a polymer network comprising the cured composition described herein, a polymer catalyst, and catalyst dispersion; as well as methods.

12 Claims, 3 Drawing Sheets

(51) Int. Cl.

| | |
|---|---|
| ***C08L 33/26*** | (2006.01) |
| ***C08L 63/00*** | (2006.01) |
| ***C08L 81/00*** | (2006.01) |

(58) Field of Classification Search

CPC .... C09J 181/02; C07C 321/18; C07C 323/14; C08L 81/02; C08L 81/00; C08L 33/26; C08L 63/00; B05D 3/02; C08F 8/34; B64D 45/02; B01J 31/06

See application file for complete search history.

(56) References Cited

U.S. PATENT DOCUMENTS

| | | | | |
|---|---|---|---|---|
| 2,800,457 | A | 7/1957 | Green | |
| 2,800,458 | A | 7/1957 | Green | |
| 3,496,250 | A | 2/1970 | Czerwinski | |
| 4,165,425 | A | 8/1979 | Bertozzi | |
| 4,366,307 | A | 12/1982 | Singh | |
| 4,524,181 | A | 6/1985 | Adam | |
| 4,609,762 | A | 9/1986 | Morris | |
| 4,749,728 | A | 6/1988 | Craun | |
| 4,879,414 | A | 11/1989 | Johnson et al. | |
| 5,214,098 | A | 5/1993 | Setiabudi | |
| 5,225,472 | A | 7/1993 | Cameron | |
| 5,271,881 | A | 12/1993 | Redding, Jr. | |
| 5,506,279 | A | 4/1996 | Babu | |
| 5,610,243 | A | 3/1997 | Vietti | |
| 5,902,836 | A | 5/1999 | Bennett | |
| 5,912,319 | A | 6/1999 | Zook | |
| 5,959,071 | A | 9/1999 | DeMoss | |
| 6,172,179 | B1 | 1/2001 | Zook | |
| 6,509,418 | B1 | 1/2003 | Zook | |
| 9,499,668 | B2 | 11/2016 | Cai | |
| 10,619,058 | B2 | 4/2020 | Yachi et al. | |
| 2004/0241130 | A1 | 12/2004 | Tamareselvy | |
| 2007/0015867 | A1 * | 1/2007 | Maekawa ............. | D06M 15/27<br>524/544 |
| 2007/0027233 | A1 | 2/2007 | Yamaguchi | |
| 2013/0037213 | A1 | 2/2013 | Frick | |
| 2013/0255879 | A1 | 10/2013 | Bieber et al. | |
| 2013/0261228 | A1 | 10/2013 | Marks | |

FOREIGN PATENT DOCUMENTS

| | | | |
|---|---|---|---|
| CN | 104802479 | | 7/2015 |
| CN | 107709376 | A | 2/2018 |
| JP | 2009-203453 | A | 9/2009 |
| WO | 1999-036484 | | 7/1999 |
| WO | 2013/005050 | A1 | 1/2013 |
| WO | 2014-172305 | | 10/2014 |
| WO | 2015-084627 | | 6/2015 |
| WO | 2016/176548 | A1 | 11/2016 |
| WO | 2018-085546 | | 5/2018 |
| WO | 2018/111637 | A1 | 6/2018 |
| WO | 2020-079556 | | 4/2020 |
| WO | 2020-104942 | | 5/2020 |

OTHER PUBLICATIONS

International Search Report for PCT International Application No. PCT/IB2019/059610, mailed on Feb. 10, 2020, 5 pages.

* cited by examiner

POLYMER COMPRISING HYDROXY GROUPS AND TERTIARY AMINE GROUPS SUITABLE FOR USE AS A CATALYST

SUMMARY

Although various amine catalysts have been described; industry would find advantage in polymeric catalysts that can be utilized to extend and/or control the open time of amine-reactive materials, such as epoxy resin.

In one embodiment, a composition is described comprising an amine-reactive material; and a polymeric catalyst comprising hydroxyl groups and tertiary amine groups. The polymeric catalyst is typically suspended or dispersed in a liquid dispersant. The liquid dispersant does not covalently bond with the tertiary amine groups. The liquid dispersant is typically a hydroxy-functional or thiol-functional.

The polymeric catalyst is a reaction product of at least one hydroxyl-functional ethylenically unsaturated monomer and at least one ethylenically unsaturated monomer comprising a tertiary amine group. The amine-reactive material typically comprises at least two amine-reactive groups. In some embodiments, the amine-reactive material comprises a polyepoxide.

In another embodiment, a method of making a polymer network is described comprising applying the composition described herein to a surface; and allowing the composition to cure at room temperature on the surface to provide the polymer network.

In another embodiment, s polymer network is described comprising the cured composition described herein. After the polymeric catalyst reacts with the amine-reactive material, the polymeric catalyst is incorporated into the (e.g. epoxy resin) polymer network. This can prevent the polymeric catalyst from blooming to the surface which can reduce interfacial adhesion.

In another embodiment, a polymeric catalyst is described comprising hydroxyl groups and tertiary amine groups.

In another embodiment, a catalyst dispersion is described comprising a continuous phase comprising a dispersant; and a discontinuous phase comprising the polymeric catalyst described herein.

In another embodiment, a method of making a polymeric catalyst is described.

DETAILED DESCRIPTION

Figure 1:
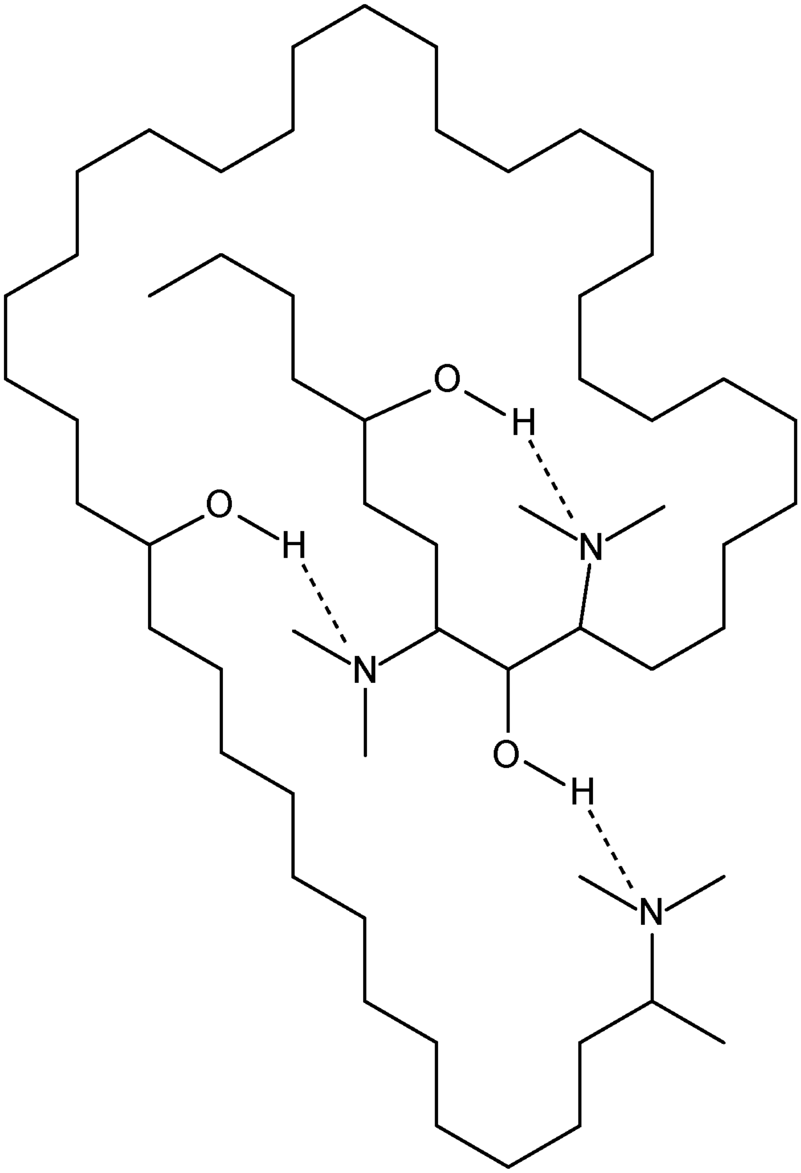
FIG. 1 is an illustrative copolymer suitable for use as a catalyst.

Presently described is a polymer. The polymer comprises hydroxyl groups and tertiary amine groups. Without intending to be bound by theory it is surmised that the hydroxyl groups hydrogen bond with nitrogen atoms of the tertiary amine, such as illustrated in FIG. 1. The polymeric structure and/or the hydrogen bonding can physically hinder the accessibility of the tertiary amine groups from reacting with an amine-reactive material, such as an epoxy resin. Thus, such polymeric catalyst described herein can be slower to react, thereby increasing the open time.

In typical embodiments, the polymer is copolymer of at least two ethylenically unsaturated monomers. The first ethylenically unsaturated monomer is a hydroxyl-functional monomer. The second ethylenically unsaturated monomer comprises a tertiary amine group. In typical embodiments, the ethylenic unsaturation is free-radically polymerizable such as in the case of (meth)acryl monomer, specifically (meth)acrylamide and (meth)acrylate. The term (meth)acrylamide refers to methacrylamide and acrylamide. Likewise, the term (meth)acrylate refers to methacrylate and acrylate. In some embodiments, methacrylamide, acrylamide, methacrylate, or acrylate may be preferred.

The first hydroxyl-functional ethylenically unsaturated monomer typically has the general formula $$HOQ_1(A)_p$$

wherein $Q_1$ is a polyvalent organic linking group and A is an ethylenically unsaturated group, such as a (meth)acryl group. The (meth)acryl group typically has the formula $-XC(=O)C(R_1)=CH_2$, wherein $R_1$ is H or alkyl of 1 to 4 carbon atoms (e.g. methyl), X is oxygen or $NR_2$, and $R_1$ and $R_2$ are independently hydrogen or alkyl of 1, 2, 3, or 4 carbon atoms; and p is 1 or 2.

$Q_1$ is typically a straight or branched chain or cycle-containing aliphatic connecting group. $Q_1$ can optionally include heteroatoms such as oxygen and/or sulfur. $Q_1$ can also optionally include a heteroatom-containing functional group such as carbonyl or sulfonyl, and combinations thereof.

In some embodiments, $Q_1$ is a hydrocarbon group (i.e. lacking heteroatoms) comprising 2 to 26 carbon atoms, or in other words alkylene. In some embodiments, $Q_1$ comprises at least 4 or 6 carbons atoms. When $Q_1$ is too short it may be difficult for the (pendent) hydroxyl group to hydrogen bond with the tertiary amine group.

Suitable examples of hydroxy functional (meth)acryl monomers include for example, 2-hydroxyethyl (meth)acrylate, hydroxypropyl (meth)acrylate, hydroxybutyl (meth) acrylate, caprolactone mono(meth)acrylate, available under the trade designation "SR-495B" from Sartomer (Exton, PA) and other poly(e-caprolactone) mono[2-(meth)acryloxy ethyl] esters, poly(e-caprolactone) mono[2-acryloxy ethyl] esters, glycerol di(meth)acrylate, 1-(acryloxy)-3-(methacryloxy)-2-propanol, 4-hydroxycyclohexyl (meth)acrylate, 2-hydroxy-3-alkyloxy(meth)acrylate, polyethylene glycol mono(meth)acrylate, mono-methoxy polyethylene glycol mono(meth)acrylate, polypropylene glycol mono(meth) acrylate, mono-methoxy polypropylene glycol mono(meth) acrylate, 1,3-glycerol dimethacrylate, and pentaerythritol triacrylate. In some embodiments, two or more hydroxy functional (meth)acryl monomers may be utilized in the preparation of the copolymer.

When the first hydroxyl-functional ethylenically unsaturated monomer(s) has the the general formula described above, the copolymer typically has pendent and terminal hydroxyl groups.

The second ethylenically unsaturated monomer comprising a tertiary amine group typically has the general formula $$R_3Q_2(A)_p$$

wherein $R_3$ is a tertiary amine group; $Q_2$ is a polyvalent organic linking group, and A is an ethylenically unsaturated group, such as a (meth)acryl group. The (meth)acryl group typically has the formula $-XC(=O)C(R_1)=CH_2$, wherein $R_1$ is H or alkyl of 1 to 4 carbon atoms (e.g. methyl), X is oxygen or $NR_2$, and $R_1$ and $R_2$ are independently hydrogen or alkyl of 1, 2, 3, or 4 carbon atoms; and p is 1 or 2.

Although $Q_2$ can be the same as $Q_1$ as described above, in the case of various commercially available (meth)acryl monomers comprising a tertiary amine group, $Q_2$ is typically alkylene of 1, 2, 3 or 4 carbon atoms.

In some embodiments, $R_3$ is $N(R_4)_2$ wherein each $R_4$ is independently alkyl of 1, 2, 3, or 4 carbon atoms.

Some suitable (meth)acryl monomers with tertiary amine groups include N-[3-N,N,-dimethylamino)propyl](meth)acrylamide (DMAPM); N-[2-(N,N-dimethylamino)propyl](meth)acrylamide; [2-(N,N-dimethylamino)ethyl](meth)acrylate; 2-(tert-butylamino)ethyl (meth)acrylate; and 2-diisopropylaminoethyl (meth)acrylate depicted as follows:

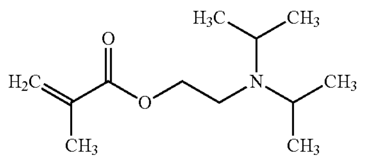

In other embodiments, $R_3$ is a cyclic tertiary amine, such as in the case of 2-N-morpholinoethyl (meth)acrylate depicted as follows:

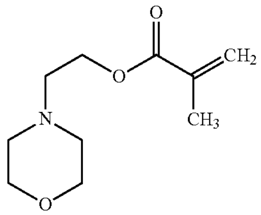

In some embodiments, such as in the case of N-[3-N,N,-dimethylamino)propyl](meth)acrylamide (DMAPM), the ethylenically unsaturated monomer with tertiary amine groups is both a hydrogen bond donor and hydrogen bond acceptor.

In some embodiments, two or more ethylenically unsaturated monomers with tertiary amine groups may be utilized in the preparation of the copolymer.

When the second ethylenically unsaturated monomer(s) with tertiary amine groups has the the general formula described above, the copolymer typically has pendent tertiary amine groups.

The amount of each of the first and second ethylenically unsaturated monomer(s) utilized in the preparation of the copolymer can vary.

In typical embodiments, the polymeric catalyst comprises at least 0.1, 0.5, or 1 mol. % of tertiary amine groups ranging up to 2, 3, 4, or 5 mol. % of tertiary amine groups. Further, the polymeric catalyst typically comprises at least one hydroxyl group per polymer chain.

In typical embodiments, the amount of ethylenically unsaturated monomer(s) with tertiary amine groups is greater than the amount of hydroxy-functional ethylenically unsaturated monomer(s). In some embodiments, the molar ratio of ethylenically unsaturated monomer(s) with tertiary amine groups to hydroxy-functional ethylenically unsaturated monomer(s) is typically at least 0.5:1 or 1:1 ranging up to 10:1, 20:1 or greater.

The ethylenically unsaturated monomers can be polymerized by various free-radical polymerization techniques. In one embodiment, the copolymer is prepared by solventless radiation polymerization, including processes using electron beam, gamma, and especially ultraviolet light radiation. One method of preparing the copolymer comprises combining the first hydroxyl-functional ethylenically unsaturated monomer(s) and second ethylenically unsaturated monomer(s) comprising a tertiary amine group forming a monomer mixture; dispersing the monomer mixture in a liquid dispersant; and free-radially polymerizing the ethylenically unsaturated monomers of the monomer mixture. In this embodiment, the polymerization can be conducted in the absence of (e.g. unpolymerizable) organic solvents.

The concentration of polymeric catalyst may be 5% to 90%, 10% to 90%, or 30% to 90%, based on the total weight of the polymeric catalyst and liquid dispersant.

Prior to polymerization the monomer mixture forms a discontinuous phase dispersed within a continuous phase of the liquid dispersant. The monomer mixture is typically a liquid at ambient temperature (25° C.). In some embodiments, the first and second ethylenically unsaturated monomers are both (e.g. miscible) liquids. In other embodiments, one of the first or second ethylenically unsaturated monomers is a liquid and the other is a solid. The solid ethylenically unsaturated monomer is soluble in the liquid ethylenically unsaturated monomer.

The dispersant is generally a liquid material at ambient temperature (25° C.) that does not covalently bond with a tertiary amine. In some embodiments, the dispersant may be characterized by a pKa of at least 3.2. In some embodiments, the pKa does not exceed 4. In some embodiments, the liquid dispersant is hydroxyl-functional (e.g. glycerol) or thiol-functional (e.g. polythiol lacking amine-reactive groups such as epoxy groups). The hydroxy or thiol functional groups of the dispersant can aid in stabilizing the suspension. In some embodiments, such as in the case of polythiol, the dispersant is also a component of a (e.g. two-part) epoxy resin composition.

In some embodiments, the monomer mixture further comprises a photoinitiator. Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, PA), bis(2,4,6-trimethylbenzoyl)-phenylphosphineoxide available under the trade designation IRGACURE 819 and dimethylhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl) oxime.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added to the composition. Such polymerizable photoinitiators are described, for example, in U.S. Pat. Nos. 5,902,836 and 5,506,279 (Gaddam et al.).

Photoinitiator(s) are typically present in an amount from 0.1 to 1.0 wt-% based on the total amount of the monomer mixture.

The composition including the liquid dispersant and monomer mixture may be irradiated with actinic (e.g. ultraviolet (UV)) radiation to polymerize the ethylenically unsaturated monomer(s). UV light sources can be of various types including relatively low light intensity sources such as blacklights, which provide generally 10 $mW/cm^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, VA) over a wavelength range of 280 to 400 nanometers; and relatively high light intensity sources such as medium pressure mercury lamps which provide intensities generally greater than 10 $mW/cm^2$, preferably 15 to 450 $mW/cm^2$. Intensities can range from 0.1 to 150 $mW/cm^2$, preferably from 0.5 to 100 $mW/cm^2$, and more preferably from 0.5 to 50 $mW/cm^2$. The monomer component(s) can also be polymerized with high intensity light sources as available from Fusion UV Systems Inc. UV light to polymerize the monomer component(s) can be provided by light emitting diodes, blacklights, medium pressure mercury lamps, etc. or a combination thereof.

The ethylenically unsaturated groups of the first and second monomer(s) polymerize to form a copolymer having an acrylic backbone. The acrylic backbone comprises pendent and terminal hydroxyl groups in combination with pendent and terminal tertiary amine groups. Such copolymer is suspended or dispersed within the liquid dispersant.

Figure 2:
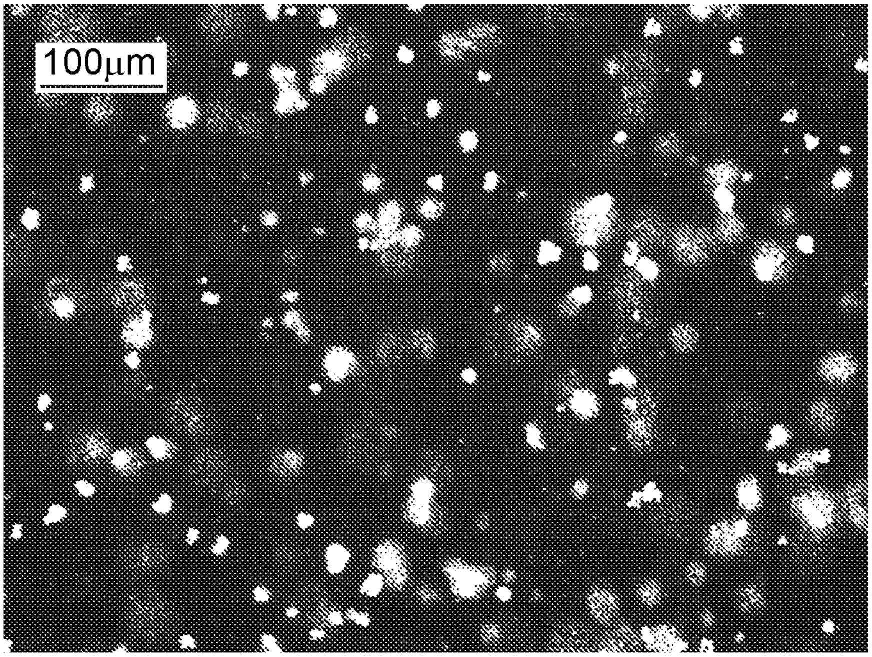
FIG. 2 is an optical microscopy image of an embodied polymeric catalyst segregated in a liquid dispersant.
Figure 3:
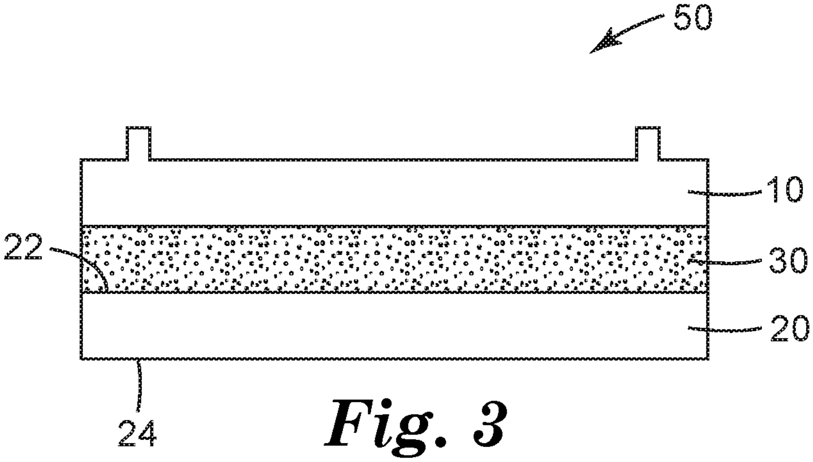
FIG. 3 illustrates an example of a battery module that includes an embodiment of the composition of the present disclosure.
Figure 4:
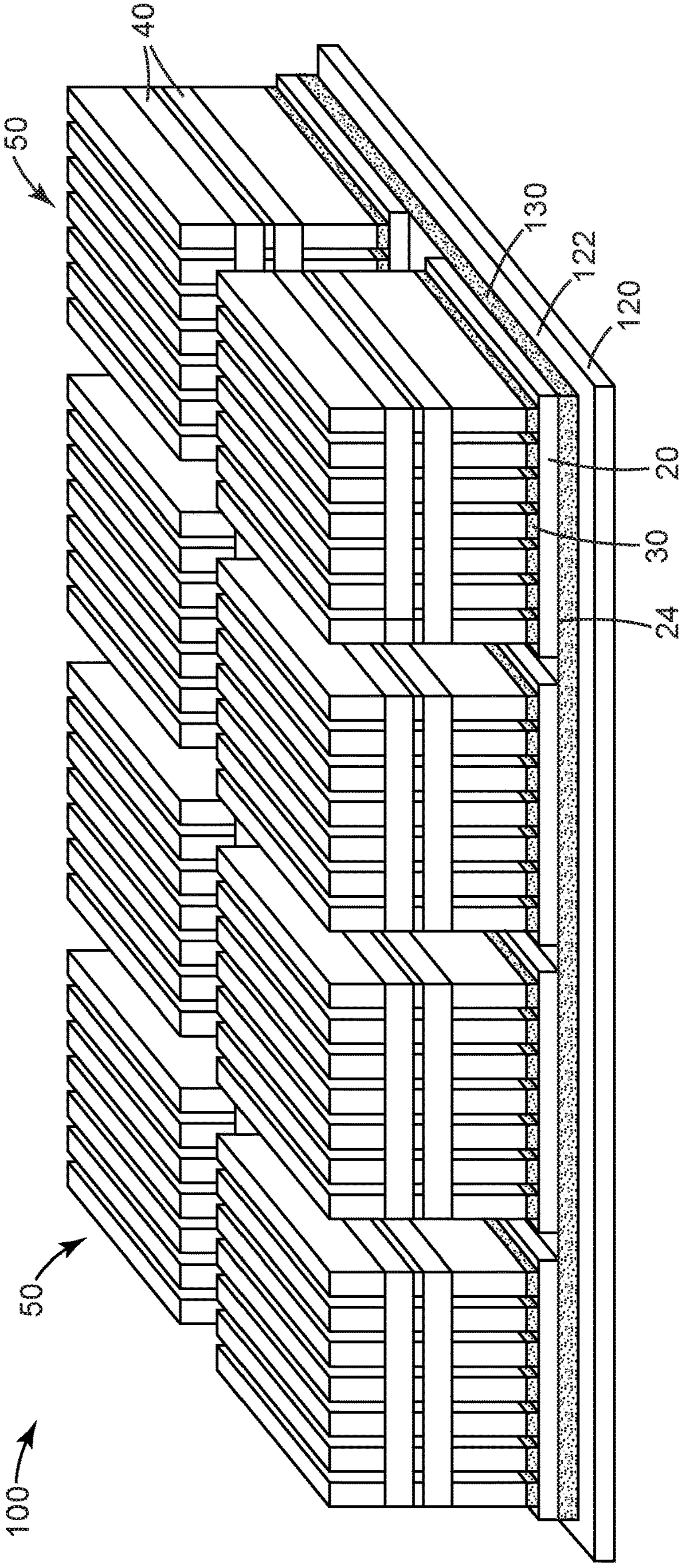
FIG. 4 illustrates an example of an assembled battery subunit according to some embodiments of the present disclosure.

One of ordinary skill in the art appreciates that a dispersion is a system in which discrete particles of one material are dispersed in a continuous phase of another material. The two phases may be in the same or different states of matter. A suspension is a heterogeneous mixture that contains solid particles sufficiently large for sedimentation. The particles may be visible to the naked eye, usually must be larger than 1 micrometer, and typically eventually settle. FIG. 2 is an optical microscopy image of an embodied polymeric catalyst in a liquid dispersant, wherein the liquid dispersant is depicted in black.

The size of the dispersed polymeric catalyst can vary. In some embodiments, the dispersed polymeric catalyst may have an average particle or droplet size of at least 0.1, 0.5, or 1 micron. In some embodiments, the average particle or droplet size is no greater than 1 mm (1000 microns). In some, the average particle or droplet size is no greater than 900, 800, 700, 600, 500, 400, 300, 200, or 100 microns.

In some, the average particle or droplet size is no greater than 90, 80, 70, 60, 50, 40, 30, 20, or 10 microns.

In some embodiments, the liquid dispersant comprises at least 5, 10, 15, 20, 25, or 30 wt. % of the polymeric catalyst described herein. The amount of polymeric catalyst in the liquid dispersant can range up to about 50 wt. %. The polymeric catalyst typically has a molecular weight (Mw) of at least 500, 1000, 1500, 2000, 2500, or 3000 g/mole. The molecular weight (Mw) is typically no greater than 10,000 g/mole. In some embodiments, the molecular weight (Mw) is no greater than 9,000; 8,000; 7,000; 6,000, or 5,000 g/mole. The polydispersity of the polymeric catalyst can range from about 2 to 5. The molecular weight and polydispersity can be determined using Gel Permeation Chromatography with polystyrene standards (as further described in the examples).

The polymeric catalyst comprising hydroxyl groups and tertiary amine groups is suitable for use as a catalyst in various composition comprising an amine-reactive material.

In typical embodiment, the polymeric catalyst in utilized is an amount of at least 0.1, 0.2, 0.3, 0.4, 0.5, 0.6, 0.7, 0.8, 0.9, or 1 wt. % based on the total weight of the (e.g. two-part composition). The amount of polymeric catalyst typically ranges up to 2, 3, 4, or 5 wt. % based on the total weight of the (e.g. two-part composition).

Generally, in order to achieve chemical crosslinking, the amine-reactive material comprises at least two amine-reactive (e.g. epoxy) groups.

In some embodiments, the amine-reactive material is a polyepoxide. A variety of polyepoxides having more than one epoxide group can be cured with the polymeric catalysis described herein. In some embodiments, the polyepoxide is monomeric. In some embodiments, the polyepoxide is oligomeric or polymeric (that is, an epoxy resin). A monomeric polyepoxide may be an alkylene, arylene, alkylarylene, arylalkylene, or alkylenearylalkylene having at least two epoxide groups, wherein any of the alkylene, alkylarylene, arylalkylene, or alkylenearylalkylene are optionally interrupted by one or more ether (i.e., —O—), thioether (i.e., —S—), or amine (i.e., —$NR^1$—) groups and optionally substituted by alkoxy, hydroxyl, or halogen (e.g., fluoro, chloro, bromo, iodo). Useful monomeric polyepoxides may be diepoxides or polyepoxides with 2 or (in some embodiments, 3 or 4) epoxide groups. An epoxy resin may be prepared by chain-extending any of such polyepoxides.

Some useful polyepoxides are aromatic. Useful aromatic polyepoxides and epoxy resins typically contain at least one (in some embodiments, at least 2, in some embodiments, in a range from 1 to 4) aromatic ring (e.g., phenyl group) that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For polyepoxides and epoxy resin repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo). In some embodiments, the aromatic polyepoxide or epoxy resin is a novolac. In these embodiments, the novolac epoxy may be a phenol novolac, an ortho-, meta-, or para-cresol novolac, or a combination thereof. In some embodiments, the aromatic polyepoxide or epoxy resin is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. In some embodiments, the polyepoxide is a novolac epoxy resin (e.g., phenol novolacs, ortho-, meta-, or para-cresol novolacs or combinations thereof), a bisphenol epoxy resin (e.g., bisphenol A, bisphenol F, halogenated bisphenol epoxies, and combinations thereof), a resorcinol epoxy resin, and combinations of any of these. Examples of useful aromatic monomeric polyepoxides include the diglycidyl ethers of bisphenol A and bisphenol F and tetrakis glycidyl-4-phenylolethane and mixtures thereof.

Some useful polyepoxides are non-aromatic. The non-aromatic epoxy can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (x) of oxyalkylene groups, $OR^1$, wherein each $R^1$ is independently $C_2$ to $C_5$ alkylene, in some embodiments, $C_2$ to $C_3$ alkylene, x is 2 to about 6, 2 to 5, 2 to 4, or 2 to 3. Examples of useful non-aromatic monomeric polyepoxides include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, propanediol diglycidyl ether, butanediol diglycidyl ether, and hexanediol diglycidyl ether. Examples of useful polyepoxides having more than two epoxide groups include glycerol triglycidyl ether, and polyglycidyl ethers of 1,1,1-trimethylolpropane, pentaerythritol, and sorbitol. Other examples of useful polyepoxides include glycidyl ethers of cycloaliphatic alcohols (e.g., 1,4-cyclohexanedimethanol, bis(4-hydroxycyclohexyl)methane or 2,2-bis(4-hydroxycyclohexyl)propane), cycloaliphatic epoxy resins (e.g., bis(2,3-epoxycyclopentyl) ether, 2,3-epoxycyclopentyl glycidyl ether, 1,2-bis(2,3-epoxycyclopentyloxy)ethane and 3,4-epoxycyclohexylmethyl 3',4'-epoxycyclohexanecarboxylate), and hydantoin diepoxide. Examples of polyepoxides having amine groups include poly(N-glycidyl) compounds obtainable by dehydrochlorinating the reaction products of epichlorohydrin with amines containing at least two amine hydrogen atoms. These amines are, for example, aniline, n-butylamine, bis(4-aminophenyl) methane, m-xylylenediamine or bis(4-methylaminophenyl) methane. Examples of polyepoxides having thioether groups include di-S-glycidyl derivatives of dithiols (e.g., ethane-1,2-dithiol or bis(4-mercaptomethylphenyl) ether).

In some embodiments, the polyepoxide is an oligomeric or polymeric diepoxide. In some embodiments, epoxides may be chain extended to have any desirable epoxy equivalent weight. Chain extending epoxy resins can be carried out by reacting a monomeric diepoxide, for example, with a diol in the presence of a catalyst to make a linear polymer. In some embodiments, the resulting epoxy resin (e.g., either an aromatic or non-aromatic epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. Epoxy equivalent weights may be selected, for example, so that the epoxy resin may be used as a liquid.

Epoxy resins of various classes and epoxy equivalent weights are commercially available from Olin Corporation, Clayton, MO; Momentive Specialty Chemicals, Inc., Columbus, OH; Huntsman Advanced Materials, The Woodlands, Tex.; CVC Specialty Chemicals Inc. Akron, OH (acquired by Emerald Performance Materials); and Nan Ya Plastics Corporation, Taipei City, Taiwan. Examples of commercially available glycidyl ethers include diglycidylethers of bisphenol A (e.g. those available under the trade designations "EPON 828", "EPON 1001", "EPON 1310" and "EPON 1510" from Hexion Inc., Columbus, OH, those available under the trade designation "D.E.R." from Olin Corporation (e.g., D.E.R. 331, 332, and 334), those available under the trade designation "EPICLON" from Dainippon Ink and Chemicals, Inc. (e.g., EPICLON 840 and 850) and those available under the trade designation "YL-980" from Japan Epoxy Resins Co., Ltd.); diglycidyl ethers of bisphenol F (e.g. those available under the trade designation "EPICLON" from Dainippon Ink and Chemicals, Inc. (e.g., "EPICLON 830")); polyglycidyl ethers of novolac resins (e.g., novolac epoxy resins, such as those available under the trade designation "D.E.N." from Olin Corporation (e.g., D.E.N. 425, 431, and 438)); and flame retardant epoxy resins (e.g., "D.E.R. 580", a brominated bisphenol type epoxy resin available from Olin Corporation). Examples of commercially available non-aromatic epoxy resins include the glycidyl ether of cyclohexane dimethanol, available from Hexion Specialty Chemicals GmbH, under the trade designation "HELOXY MODIFIER 107".

In some embodiments, the polyepoxide in an epoxy-functional polythiol such as "THIO-FLEP 60" available from Toray Industries Inc, Japan.

In some embodiments, the polymeric catalysis described herein is utilized in a composition comprising a polyepoxy and a polythiol. The polymeric catalyst may be provided in a polythiol dispersant, as previously described.

Typically, the amounts of the polythiol(s) and polyepoxide(s) are selected for the composition such that there is a stoichiometric equivalence of mercaptan groups and epoxide groups. In some embodiments, the number of the mercaptan groups is within 20, 15, 10, 5, 4, 3, or 2 percent of the number of the epoxide groups.

In some embodiments, the polythiol is monomeric. In some embodiments, the polythiol has a molecular weight of up to 500 grams per mole. In this embodiment, the polythiol may be an alkylene, arylene, alkylarylene, arylalkylene, or alkylenearylalkylene having at least two mercaptan groups. The alkylene, alkylarylene, arylalkylene, or alkylenearylalkylene can further comprise heteroatoms such as oxygen or sulfur and optionally substituted with alkoxy or hydroxyl.

Useful monomeric polythiols may be dithiols or polythiols with more than 2 (in some embodiments, 3 or 4) mercaptan groups. In some embodiments, the polythiol is an alkylene dithiol in which the alkylene is optionally interrupted by one or more ether (i.e., —O—) or thioether (i.e., —S—) groups.

Examples of useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. Examples of polythiols having more than two mercaptan groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid. Combinations of any of these or with any of the dithiols mentioned above may be useful.

In some embodiments, the polythiol comprises ester groups. In some embodiments, the polythiol is multifunctional alkylene thiol in which the alkylene is optionally interrupted by one or more ester (i.e., —C(O)O—) groups. Such polythiols can be formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively. For example, esters of thioglycolic acid, α-mercaptopropionic acid, and β-mercaptopropionic acid with polyhydroxy compounds (polyols) such as diols (e.g., glycols), triols, tetraols, pentaols, and hexaols. Specific examples of such polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate) and ethoxylated versions, pentaerythritol tetrakis (thioglycolate), pentaerythritol tetrakis(β-mercaptopropionate), and tris(hydroxyethyl)isocyanurate tris(β-mercaptopropionate). Combinations of any of these or with any of the dithiols mentioned above may be useful.

Examples of useful commercially available polythiols include those available under the trade designations THIOCURE PETMP (pentaerythritol tetra(3-mercaptopropionate)), TMPMP (trimethylolpropane tri(3-mercaptopropionate)), ETTMP (ethoxylated trimethylolpropane tri(3-mercaptopropionate) such as ETTMP 1300 and ETTMP 700), GDMP glycol di(3-mercaptopropionate), TMPMA (trimethylolpropane tri(mercaptoacetate)), TEMPIC (tris[2-(3-mercaptopropionyloxy)ethyl] isocyanurate), and PPGMP (propylene glycol 3-mercaptopropionate) from Bruno Bock Chemische Fabrik GmbH & Co. KG. Other examples include the 3-mercaptopropionates (also referred to as β-mercaptopropionates) of ethylene glycol and trimethylolpropane (the former from Chemische Fabrik GmbH & Co. KG, the latter from Sigma-Aldrich).

In some embodiments, the polythiol is oligomeric or polymeric. In some embodiments, the polythiol has a number average molecular weight of greater than 500 grams per mole, in some embodiments, at least 1000 grams per mole. Examples of useful oligomeric or polymeric polythiols include polythioethers and polysulfides. Polythioethers include thioether linkages (i.e., —S—) in their backbone structures. Polysulfides include disulfide linkages (i.e., —S—S—) in their backbone structures.

Polythioethers can be prepared, for example, by reacting dithiols with dienes, diynes, divinyl ethers, diallyl ethers, ene-ynes, or combinations of these under free-radical conditions. Useful dithiols include any of the dithiols listed above. Examples of suitable divinyl ethers include divinyl ether, ethylene glycol divinyl ether, butanediol divinyl ether, hexanediol divinyl ether, diethylene glycol divinyl ether, triethylene glycol divinyl ether, tetraethylene glycol divinyl ether, cyclohexanedimethanol divinyl ether, polytetrahydrofuryl divinyl ether, and combinations of any of these. Useful divinyl ethers of formula $CH_2{=}CH{-}O{-}({-}R^2{-}O{-})_m{-}CH{=}CH_2$, in which m is a number from 0 to 10 and $R^2$ is a $C_2$ to $C_6$ branched alkylene can be prepared by reacting a polyhydroxy compound with acetylene. Examples of compounds of this type include compounds in which $R^2$ is an alkyl-substituted methylene group such as $-CH(CH_3)-$ (e.g., those obtained from BASF, Florham Park, N.J, under the trade designation "PLURIOL", for which $R^2$ is ethylene and m is 3.8) or an alkyl-substituted ethylene (e.g., $-CH_2CH(CH_3)-$ such as those obtained from International Specialty Products of Wayne, N.J., under the trade designation "DPE" (e.g., "DPE-2" and "DPE-3"). Examples of other suitable dienes, diynes, and diallyl ethers include 4-vinyl-1-cyclohexene, 1,5-cyclooctadiene, 1,6-heptadiyne, 1,7-octadiyne, and diallyl phthalate. Small amounts trifunctional compounds (e.g., triallyl-1,3,5-triazine-2,4,6-trione, 2,4,6-triallyloxy-1,3,5-triazine) may also be useful in the preparation of oligomers.

Examples of oligomeric or polymeric polythioethers are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.). In some embodiments, the polythioether is represented by formula $HS{-}R^3{-}[S{-}(CH_2)_2{-}O{-}[{-}R^4{-}O{-}]_m{-}(CH_2)_2{-}S{-}R^3{-}]_n{-}SH$, wherein each $R^3$ and $R^4$ is independently a $C_{2\text{-}6}$ alkylene, wherein alkylene may be straight-chain or branched, $C_{6\text{-}8}$ cycloalkylene, $C_{6\text{-}10}$ alkylcycloalkylene, $-[(CH_2-)_p-X-]_q-(-CH_2-)_r$, in which at least one $-CH_2-$ is optionally substituted with a methyl group, X is selected from the group consisting of O, S and $-NR^5-$, $R^5$ denotes hydrogen or methyl, m is a number from 0 to 10, n is a number from 1 to 60, p is an integer from 2 to 6, q is an integer from 1 to 5, and r is an integer from 2 to 10. Polythioethers with more than two mercaptan groups may also be useful.

In some embodiments, a free-radical initiator may be combined with the dithiols with dienes, diynes, divinyl ethers, diallyl ethers, ene-ynes, or combinations of these, and the resulting mixture is heated to provide the polythioethers. Examples of suitable free-radical initiators include azo compounds (e.g., 2,2'-azobisisobutyronitrile (AIBN), 2,2'-azobis(2-methylbutyronitrile), or azo-2-cyanovaleric acid). In some embodiments, the free-radical initiator is an organic peroxide. Examples of useful organic peroxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy) cyclohexane, 1,1-di(tert-butylperoxy)-3,3,5-trimethylcyclohexane, and cyclohexanone peroxide), and diacylperoxides (e.g., benzoyl peroxide or lauryl peroxide). The organic peroxide may be selected, for example, based on the temperature desired for use of the organic peroxide and compatibility with the monomers. Combinations of two or more organic peroxides may also be useful.

The free-radical initiator useful for making a polythioether may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the monomers. When using a photoinitiator, the polythioether is typically prepared using an actinic light source (e.g., at least one of a blue light source or a UV light source).

Polythioethers can also be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups. In some embodiments, the diepoxide is a bisphenol diglycidyl ether, wherein the bisphenol (i.e., $-O-C_6H_5-CH_2-C_6H_5-O-$) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by formula $-S-R^3-S-CH_2-CH(OH)-CH_2-O-C_6H_5-CH_2-C_6H_5-O-CH_2-CH(OH)-CH_2-S-R^3-S-$, wherein $R^3$ is as defined above, and the bisphenol (i.e., $-O-C_6H_5-CH_2-C_6H_5-O-$) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Mercaptan terminated polythioethers of this type can also be reacted with any of the dienes, diynes, divinyl ethers, diallyl ethers, and ene-ynes listed above under free radical conditions. Any of the free-radical initiators and methods described above may be useful for preparing the polythioethers. In some embodiments, the thermal initiators described above are used, and the resulting mixture is heated to provide the polythioethers.

Polysulfides are typically prepared by the condensation of sodium polysulfide with bis-(2-chloroethyl) formal, which provides linear polysulfides having two terminal mercaptan groups. Branched polysulfides having three or more mercaptan groups can be prepared using trichloropropane in the reaction mixture. Examples of useful polysulfides are described, for example, in U.S. Pat. No. 2,466,963 (Patrick et al); U.S. Pat. No. 2,789,958 (Fettes et al); U.S. Pat. No. 4,165,425 (Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", "LP-55", "LP-0010-BL", "LP-32M", "LP12M" and "LP-541", and under the trade designations "THIOPLAST G4" and "THIOPLAST G44" from Nouryon, Amsterdam, The Netherlands.

In some embodiments, the polysulfides can be represented by the following formula:

$$HS—C_2H_4—O—CH_2—O—C_2H_4—S—S)_n—C_2H_4—O—CH_2—O—C_2H_4—SH$$

Polythioethers and polysulfides can have a variety of useful molecular weights. In some embodiments, the polythioethers and polysulfides have number average molecular weights in a range from 500 grams per mole to 20,000 grams per mole, 1,000 grams per mole to 10,000 grams per mole, or 2,000 grams per mole to 5,000 grams per mole.

Another example of a polymeric or oligomeric polythiol is polypropylene-ether glycol bis(β-mercaptopropionate), which is prepared from polypropylene-ether glycol (e.g., PLURACOL P201, Wyandotte Chemical Corp.) and β-mercaptopropionic acid by esterification.

Further useful polythiols include those prepared from a ring-opening reaction of epoxides with $H_2S$ (or its equivalent), those prepared from the addition of $H_2S$ (or its equivalent) across carbon-carbon double bonds, POLYMERCAPTAN 805C (mercaptanized castor oil); POLYMERCAPTAN 407 (mercaptohydroxy soybean oil) from Chevron Phillips Chemical Co. LLP, and CAPCURE, specifically CAPCURE 3-800 (a polyoxyalkylenetriol with mercapto end groups of the structure $R^3[O(C_3H_6O)_nCH_2CH(OH)CH_2SH]_3$ wherein $R^3$ represents an aliphatic hydrocarbon group having 1-12 carbon atoms and n is an integer from 1 to 25), from Gabriel Performance Products, Ashtabula, Ohio, and GPM-800, which is equivalent to CAPCURE 3-800, also from Gabriel Performance Products.

In some embodiments, such as when hydrolytic stability is of importance, polythiols with ether moieties are typically avoided.

In some embodiments, the amine-reactive (e.g. epoxy) material further comprises a toughening agent. Toughening agents may be useful, for example, for improving the properties (e.g., overlap shear strength or tensile strength) of some cured epoxies, for example, so that they do not undergo brittle failure when cured into a polymer network. The toughening agent (e.g., an elastomeric resin or elastomeric filler) may or may not be covalently bonded to the polyepoxide or polythiol and ultimately the crosslinked network. In some embodiments, the toughening agent includes an epoxy-terminated compound, which can be incorporated into the polymer backbone. Examples of useful toughening agents, which may also be referred to as elastomeric modifiers, include polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; elastomeric particles polymerized in situ in the epoxide from free-radical polymerizable monomers and a copolymeric stabilizer; elastomer molecules such as polyurethanes and thermoplastic elastomers; separate elastomer precursor molecules; combination molecules that include epoxy-resin segments and elastomeric segments; and, mixtures of such separate and combination molecules. The combination molecules may be prepared by reacting epoxy resin materials with elastomeric segments; the reaction leaving reactive functional groups, such as unreacted epoxy groups, on the reaction product.

The use of tougheners in epoxy resins is described in the Advances in Chemistry Series No. 208 entitled "Rubbery-Modified Thermoset Resins", edited by C. K. Riew and J. K. Gillham, American Chemical Society, Washington, 1984. The amount of toughening agent to be used depends in part upon the final physical characteristics of the cured resin desired and is generally determined empirically.

In some embodiments, the toughening agent in the composition includes graft copolymers having a polymerized diene rubbery backbone or core to which is grafted a shell of an acrylic acid ester or methacrylic acid ester, monovinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as poly(butyl acrylate) or poly(isooctyl acrylate) to which is grafted a polymethacrylate polymer shell having a $T_g$ about 25° C. such as poly (methyl methacrylate). For acrylic core/shell materials "core" will be understood to be acrylic polymer having $T_g$<0° C. and "shell" will be understood to be an acrylic polymer having $T_g$>25° C. Some core/shell toughening agents (e.g., including acrylic core/shell materials and methacrylate-butadiene-styrene (MBS) copolymers wherein the core is crosslinked styrene/butadiene rubber and the shell is polymethylacrylate) are commercially available, for example, from The Dow Chemical Company under the trade designation "PARALOID".

Another useful core-shell rubber is described in U.S. Pat. Appl. Publ. No. 2007/0027233 (Yamaguchi et al.). Core-shell rubber particles as described in this document include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber can be dispersed in a polymer or an epoxy resin. Examples of useful core-shell rubbers include those sold by Kaneka Corporation under the designation Kaneka KANE ACE, including the Kaneka "KANE ACE" 15 and 120 series of products, including Kaneka "KANE ACE MX 153", Kaneka "KANE ACE MX 154", Kaneka "KANE ACE MX 156", Kaneka "KANE ACE MX 257" and Kaneka "KANE ACE MX 120" core-shell rubber dispersions, and mixtures thereof. The products contain the core-shell rubber (CSR) particles pre-dispersed in an epoxy resin, at various concentrations. For example, "KANE ACE MX 153" core-shell rubber dispersion comprises 33% CSR, "KANE ACE MX 154" core-shell rubber dispersion comprises 40% CSR, and "KANE ACE MX 156" core-shell rubber dispersions comprises 25% CSR.

Still further examples of toughening agents useful in the composition according to the present disclosure are elastomeric particles that have a $T_g$ below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,524,181 (Adam et al.). These particles are commonly referred to as "organosols".

Still other toughening agents are rubber modified liquid epoxy resins. For example, an ABA block copolymer elastomer with epoxy-reactive groups can be reacted with an epoxy resin to provide a rubber-modified liquid epoxy resin. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. An example of such a resin is an elastomer available from Kraton Performance Polymers under the trade designation "KRATON RP6565". The modified epoxy resin is made from 85% by weight of epoxy resin "EPON 828" and 15% by weight of a rubber obtained under trade designation "KRATON". Rubbers obtained under the trade designation "KRATON" are known in the industry as elastomeric block copolymers.

Other useful toughening agents include carboxyl- and amine-terminated acrylonitrile/butadiene elastomers such as those obtained from Emerald Performance Materials, Akron, OH, under the trade designation "HYPRO" (e.g., CTBN and ATBN grades); carboxyl- and amine-terminated butadiene polymers such as those obtained from Emerald Performance Materials under the trade designation "HYPRO" (e.g., CTB grade); amine-functional polyethers such as any of those described above; and amine-functional polyurethanes such as those described in U.S. Pat. Appl. No. 2013/0037213 (Frick et al.). Polyurethane toughening agents can also include polyurethane-modified epoxy resins, isocyanate-modified epoxy resins, and combinations thereof. Isocyanate modified epoxy resins can have oxazolidine functionality if the isocyanate reacts directly with the epoxy, or ureido functionality if the isocyanate reacts with secondary hydroxyl groups present in the epoxy molecule. Examples of isocyanate- or polyurethane-modified epoxy resins useful as toughening agents in the curable adhesive compositions of the present disclosure include those available under the trade designations "EPU-17T-6", "EPU-78-11", and "EPU-1761", available from Adeka Co., those under the trade name, "D.E.R. 6508", from Dow Chemical Co., and those under the trade name, "AER 4152", available from Asahi Denka.

In some embodiments, the toughener is an acrylic core/shell polymer; a styrene-butadiene/methacrylate core/shell polymer; a polyether polymer; a carboxyl- or amino-terminated acrylonitrile/butadiene; a carboxylated butadiene, a polyurethane, or a combination thereof.

In some embodiments, the toughening agent is present in the composition in an amount up to about 25 percent by weight, based on the total weight of the composition. In some embodiments, the composition contains in the range of from about 2 percent to about 25 percent, in a range from about 5 percent to about 20 percent, or in a range from about 5 percent to about 15 percent by weight of toughening agent based on the weight of the composition excluding the conductive filler.

For a two-part (e.g. adhesive) composition according to the present disclosure, the toughening agent can be added to the first part, the second part, or both. The toughening agent can be pre-dispersed with the polythiol in the first part and/or pre-dispersed with an epoxy resin in the second part, if desired.

In some embodiments, the composition of the present disclosure also includes conductive filler. The conductive filler is present in the composition in an amount to provide the composition with a thermal conductivity of at least 0.50 W/m·K (Watt per meter×Kelvin). Thermal conductivity of the composition is determined after curing the composition using the method described in the examples, below. For some applications (e.g., thermally conductive gap fillers), a thermal conductivity of at least 0.60 W/m·K, 0.65 W/m·K, 0.70 W/m·K, 0.75 W/m·K, 0.80 W/m·K, 0.85 W/m·K, 0.90 W/m·K, 0.95 W/m·K, or 1.0 W/m·K may be desirable, in some embodiments, at least 1.5, at least 2.0, at least 2.5, or at least 3.0 W/m·K. In some embodiments of the composition of the present disclosure, a thermal conductivity of at least 3.0 W/m·K, at least 5 W/m·K, up to 10 W/m·K or up to 15 W/m·K may be achieved.

The conductive filler is at least one of thermally conductive or electrically conductive. In some embodiments the conductive filler is both thermally conductive and electrically conductive. In some embodiments, the conductive filler is thermally conductive but electrically non-conductive. Examples of suitable conductive fillers include metals (e.g., silver, aluminum, copper, and gold); ceramics (e.g., alumina, titania, silica, natural and synthetic clays, boron nitride, zinc oxide, aluminum nitride, aluminum hydroxide, and silicon carbide); carbon materials (e.g., natural and synthetic graphite, graphene, carbon black, carbon nanotubes, diamond, and fullerenes); and hybrid fillers (e.g., a metal-coated ceramic particle). Combinations of any of these conductive fillers may be useful. In some embodiments, the conductive filler comprises at least one of alumina, natural and synthetic clays, boron nitride, aluminum nitride, silicon carbide, graphite, graphene, carbon nanotubes, copper, silver, or gold. For thermally conductive gap filler applications, thermally conductive fillers, which may or may not be electrically conductive, may be useful. In some embodiments, the conductive filler comprises alumina.

Generally, the selection and loading levels of the (e.g. conductive) fillers are used to control properties, such as conductivity. Factors such as the selection of the matrix polymer (considering its rheological properties), may have a significant influence on the maximum achievable conductive filler loading. Compositions including the polythiol and the polyepoxide can accommodate unexpectedly high loading levels of (e.g. conductive) fillers while maintaining a useful viscosity and useful material properties after curing.

In some embodiments, the (e.g. conductive) filler is present in an amount of at least 20 percent by weight, in some embodiments, at least 25, 30, 35, 40, 45, or 50 percent by weight, based on the total weight of the composition. In some embodiments, the (e.g. conductive) filler is present in an amount of greater than 55 percent by weight, in some embodiments, at least 58, 60, 65, 70, or 75 percent by weight, based on the total weight of the composition. In some embodiments, the (e.g. conductive) filler is present in an amount of greater than 80 percent by weight, in some embodiments, at least 81, 82, 83, 84, or 85 percent by weight, based on the total weight of the composition.

The loading level needed for a selected thermally conductive filler is influenced by the selection of the conductive filler and the desired conductivity in the composition after curing. For example, to achieve a thermal conductivity of at least 0.95 W/m·K with an alumina-filled composition, greater than 65% by weight alumina is needed, based on the total weight of the composition. For less thermally conductive fillers such as silica and carbon black, an even higher loading of filler would be necessary. In other words, it is not possible to achieve a thermal conductivity of at least 0.95 W/m·K using silica or carbon black fillers at a loading level of less than 65 percent or up to 55 percent or 60 percent by weight, based on the total weight of the composition.

The selection of the particle size of the (e.g. conductive) filler may be useful for achieving loading levels of (e.g. conductive) fillers of greater than 20, 25, 30, 35, 40, 45, 50, 55, 60, 65, 70, 75, or 80 percent by weight, based on the total weight of the composition. For generally spherical fillers, the term size is considered to be equivalent with the diameter and height of the filler. The size distribution of the (e.g. conductive) filler may be Gaussian, normal, or non-normal. Non-normal distributions may be unimodal or multi-modal (e.g., bimodal or trimodal). An average particle size by volume is determined by laser light diffraction. Laser light diffraction particle size analyzers are available, for example, under the trade designation "SATURN DIGISIZER" from Micromeritics.

It can be useful, for example, for at least a first portion of the (e.g. conductive) filler to have a median (i.e., D50) particle size of at least 20 micrometers, in a range from 20 to 100 micrometers or 50 to 90 micrometers. Furthermore, at least a second portion of the (e.g. conductive) filler can have a median particle size in a range from 5 to 20 micrometers or 5 to 15 micrometers. It also may be useful to have a third portion of the (e.g. conductive) filler to have a median particle size of up to 5 micrometers, in some embodiments, in a range from 0.1 to 5 micrometers, 0.5 to 5 micrometers, or 0.5 to 2.5 micrometers. Including (e.g. conductive) fillers having multiple particle size distributions can be useful for achieving a high loading of (e.g. conductive) filler in the composition.

For non-spherical (e.g. conductive) fillers, the aspect ratio of the largest dimension (e.g., length) to the smallest dimension can be in a range, for example, from 2:1 to 1000:1. Fillers have larger aspect ratios (e.g., having aspect ratios of 10:1 or more) may be considered fibers. The aspect ratio of at least a portion of the (e.g. conductive) filler may be at least 2:1, 3:1, 4:1, 5:1, 10:1, 25:1, 50:1, 75:1, 100:1, 150:1, 200:1, 250:1, 500:1, 1000:1, or more. Including (e.g. conductive) fillers having different aspect ratios can be useful for achieving a high loading of (e.g. conductive) filler in the composition.

With the relatively high loading of (e.g. conductive) fillers in the compositions such as thermally conductive gap fillers, which cure between two substrates, compositions are generally curable without exposure to actinic radiation. Accordingly, in some embodiments, the composition is essentially free of a photolatent base. Similarly, in some embodiments, the amine catalyst is not generated by a photolatent base. The composition described herein is typically curable at room temperature without photochemical initiation.

Despite the relatively high loading of (e.g. conductive) fillers, compositions of the present disclosure have elongations at break once they are cured that are useful for a variety of applications. In some embodiments, the elongation at break of the polymer network formed from the composition of the present disclosure is at least 5%, 10%, 15%, 20%, or 25%. Even with a loading of (e.g. conductive) filler of 90% by weight, based on the total weight of the composition, the elongation of the polymer network was greater than 5%.

In some embodiments, compositions of the present disclosure include non-conductive particles. Examples of suitable non-conductive particles include calcium carbonate, aluminum silicate, or lightweight particles having a density of up to 0.7 grams per cubic centimeter. Suitable low density fillers may have a specific gravity ranging from about 0.9 to about 2.2 and are exemplified by calcium silicates, fumed silica, precipitated silica, and polyethylene. Examples include calcium silicate having a specific gravity of from 2.1 to 2.2 and a particle size of from 3 to 4 microns ("HUBERSORB HS-600", J. M. Huber Corp.), fumed silica having a specific gravity of 1.7 to 1.8 with a particle size less than 1 ("CAB-O-SIL TS-720", Cabot Corp.), fumed silica available from Evonik Industries under the trade designation "AEROSIL R805", and fumed alumina available from Cabot Corp., under the trade designation "SpectrAL 100". Other examples include precipitated silica having a specific gravity of from 2 to 2.1 ("HI-SIL TS-7000", PPG Industries), and polyethylene having a specific gravity of from 1 to 1.1 and a particle size of from 10 to 20 microns ("SHAMROCK S-395" Shamrock Technologies Inc.). Examples of polymeric thixotropic agents include the DISPARLON series from King Industries, Inc., Norwalk, CT Hollow ceramic elements can include hollow spheres and spheroids. The hollow ceramic elements and hollow polymeric elements may have one of a variety of useful sizes but typically have a maximum dimension of less than 10 millimeters (mm), more typically less than one mm. The specific gravities of the microspheres range from about 0.1 to 0.7 and are exemplified by polystyrene foam, microspheres of polyacrylates and polyolefins, and silica microspheres having particle sizes ranging from 5 to 100 microns and a specific gravity of 0.25 ("ECCOSPHERES", W. R. Grace & Co.). Other examples include elastomeric particles available, for example, from Akzo Nobel, Amsterdam, The Netherlands, under the trade designation "EXPANCEL". Other examples include alumina/silica microspheres having particle sizes in the range of 5 to 300 microns and a specific gravity of 0.7 ("FILLITE", Pluess-Stauffer International), aluminum silicate microspheres having a specific gravity of from about 0.45 to about 0.7 ("Z-LIGHT"), and calcium carbonate-coated polyvinylidene copolymer microspheres having a specific gravity of 0.13 ("DUALITE 6001AE", Pierce & Stevens Corp.). Further examples of commercially available materials suitable for use as hollow, ceramic elements include glass bubbles marketed by 3M Company, Saint Paul, Minnesota, as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, IL under the trade designation "SIL-CELL" (e.g., grades SIL 35/34, SIL-32, SIL-42, and SIL-43). The amount of non-conductive filler may be selected, for example, such that it is not detrimental to the desired conductivity of the composition of the present disclosure after it is cured. Metal coated hollow spheres, however, may be useful as conductive fillers in the compositions of the present disclosure.

Other fillers useful in the composition of the present disclosure impart properties such as fire resistance. Examples of suitable fillers providing fire resistance include aluminum trihydroxide (ATH) and magnesium dihydroxide.

Although the polymeric catalyst described herein is typically the primary catalyst, the composition can optionally further comprise an additional (e.g. amine) catalyst. Various (e.g. amine) catalysts are known in the art.

The additional amine catalyst can be any compound including one to four basic nitrogen atoms that bear a lone pair of electrons. The amine catalyst can include primary, secondary, tertiary amine groups, or a combination thereof. The nitrogen atom(s) in the amine catalyst can be bonded to alkyl groups, aryl groups, arylalkylene groups, alkylarylene, alkylarylenealkylene groups, or a combination thereof. The amine catalyst can also be a cyclic amine, which can include one or more rings and can be aromatic or non-aromatic (e.g., saturated or unsaturated). One or more of the nitrogen atoms in the amine can be part of a carbon-nitrogen double bond. While in some embodiments, the amine catalyst includes only carbon-nitrogen, nitrogen-hydrogen, carbon-carbon, and carbon-hydrogen bonds, in other embodiments, the amine catalyst can include other functional groups (e.g., hydroxyl or ether group). However, it is understood by a person skilled in the art that a compound including a nitrogen atom bonded to a carbonyl group is an amide, not an amine, and has different chemical properties from an amine. The amine catalyst can include carbon atoms that are bonded to more than one nitrogen atom. Thus, the amine catalyst can be a guanidine or amidine. As would be understood by a person skilled in the art, a lone pair of electrons on one or more nitrogens of the amine catalyst distinguishes them from quaternary ammonium compounds, which have a permanent positive charge regardless of pH. The amine catalyst can include a combination of one or more amines as described above. In some embodiments, the amine catalyst comprises at least one of a tertiary amine, an amidine, an imidazole, or a guanidine.

For some applications, it is desirable for the composition to cure at typical application conditions, for example, without the need for elevated temperatures or actinic radiation (e.g., ultraviolet or blue light). This is desirable, for example, for thermally conductive gap fillers useful in automotive and electronics applications. In some embodiments, the composition is curable at room temperature. In some embodiments, the composition is curable at a temperature no greater than 30° C., in some embodiments, no greater than 25° C., no greater than 22° C., or no greater than 20° C. Of course, this does not mean that higher or lower temperatures are not available in the manufacturing process, and cure time can be decreased or increased with the use of higher or lower temperatures, respectively. Also, the cure temperature may be varied throughout the cure process in order to control the cure properties. However, in some embodiments, the composition is curable without exposure to a temperature above 40° C.

The composition of the present disclosure are typically packaged as a two-part product. When packaged as a two-part composition, the first part can include the polymeric catalyst and liquid dispersant that does not covalently bond with the tertiary amine groups of the polymeric catalyst, such as polythiol, and a second part can include an amine-reactive material (e.g. polyepoxide). In some embodiments, at least one of the first part or the second part includes (e.g. conductive) filler. For the two-part products, once the user mixes the two parts, the reaction begins, and the composition starts to form into a crosslinked polymer network. However, the reaction rate can be significantly slower in view of using the (e.g. hydrogen-bonded) polymeric catalyst. After mixing, the time that the composition remains usable is called the open time or gel time (that is, the approximate amount of time the composition exhibits sufficient flow in order to be manually spread with a wooden rod at room temperature). Throughout the application life, the viscosity of the composition gradually increases until the composition is too viscous to be applied. Open time and curing rate are typically related in that short-open-time products cure quickly, and long-open-time products cure slowly.

Typically, the amount of polymeric catalyst is selected to provide the composition with a desirable amount of open time after it is mixed or thawed. In some embodiments, the composition has an open time of at least 10 minutes, at least 15 minutes, at least 20 minutes, at least 25 minutes, at least 30 minutes, at least one hour, or at least two hours. The open time is less than time to cure.

As described in the Examples, below, the time to cure can be determined as the time in which a sample of the composition can no longer be deformed when pressed with a wooden stick. Depending on the applications requirements, in some embodiments, the time to cure is no greater than 72 hours, no greater than 48 hours, no greater than 24 hours, or no greater than twelve hours. The time to cure may even be no greater than 12 hours, 6 hours, 3 hours, 1 hour and in some embodiments, no greater than 40 minutes, or even no greater than 20 minutes. An open time of at least 5 minutes, e.g., at least 10 minutes, or at least 15 minutes, or greater may be desirable to allow time for positioning and repositioning articles being bonded, such as battery cells.

As shown in the Examples below, the composition according to the present disclosure typically has an open time and cure time that can be useful for the assembly of battery modules and does not require heating above ambient conditions to cure.

In typical embodiments, the amine-reactive (e.g. epoxy) compositions described herein do not comprise an oxidizing agent.

Compositions of the present disclosure can also contain at least one of surfactants, dispersants (e.g. phosphoric ester salt available as "DISPERBYK 145", thixotropic agents, colorants (e.g., pigments and dyes), reactive diluents, rheology modifiers, plasticizers, anti-foamers, defoamers, flame retardants, coloring agents, and adhesion promoters.

Examples of useful thixotropic agents and rheology modifiers include the fumed silicas described above. Useful reactive diluents include monofunctional epoxide and monofunctional mercaptans. In some embodiments, useful adhesion promoters include organosilanes have amino functional groups (e.g., N-2-(aminoethyl)-3-aminopropyltrimethoxysilane and (3-aminopropyl)trimethoxysilane) and any of the amino-functional silanes described above. In some embodiments, useful adhesion promoters have groups polymerizable by, for example, actinic radiation. Examples of polymerizable moieties are materials that contain olefinic functionality such as styrenic, vinyl (e.g., vinyltriethoxysilane, vinyltri(2-methoxyethoxy) silane), acrylic and methacrylic moieties (e.g., 3-metacrylroxypropyltrimethoxysilane). Some functional silanes useful as adhesion promoters are commercially available, for example, from Momentive Performance Materials, Inc., Waterford, N.Y., under the trade designations "SILQUEST A-187" and "SILQUEST A-1100".

Compositions according to the present disclosure can be made by combining a first part comprising a mixture of dispersant (e.g. polythiol comprising more than one thiol group) and the polymeric catalyst described herein, with a second part comprising an amine-reactive material (e.g. a polyepoxide comprising more than one epoxide group). Combining and applying the composition can be carried out, for example, by dispensing the composition from a dispenser comprising a first chamber, a second chamber, and a mixing tip, wherein the first chamber comprises the first part, wherein the second chamber comprises the second part, and wherein the first and second chambers are coupled to the mixing tip to allow the first part and the second part to flow through the mixing tip.

Polymer networks prepared with the composition of the present disclosure as described above in any of its embodiments are useful for a variety of applications. For example, the composition of the present disclosure can be useful for thermally conductive gap fillers. Thermally conductive gap fillers are useful, for example, in batteries and battery assemblies, specifically the types of batteries used in electric and hybrid electric automobiles. Other examples of applications that can use compositions of the present disclosure include electronics (e.g., consumer electronics, medical electronics, data centers, server cooling) applications.

The selection of the polymer for a thermally conducting gap filler plays a major role in controlling one or more of (i) the rheological behavior of the uncured gap filler; (ii) the temperature of cure (e.g., curing at room temperature); (iii) time to cure profile of the gap filler (open time and cure time); (iv) the stability of the cured product (both temperature stability and chemical resistance); (v) the softness and spring back (recovery on deformation) to ensure good contact under use conditions; (vi) the wetting behavior on the base plate and battery components; (vii) the absence of contaminants (e.g., unreacted materials, low molecular weight materials) or volatile components; and (viii) the absence of air inclusions and gas or bubble formation.

In car battery applications, the thermally conductive gap filler may need to provide stability in the range of −40° C. to 90° C. The gap filler may further need to provide the desired deformation and recovery (e.g., low hardness) needed to withstand charging and discharging processes, as well as travel over varying road conditions. In some embodiments, a Shore A hardness of no greater than 90, e.g., no greater than 80, or no greater than 70 may be desired. Also, as repair and replacement may be important, in some embodiments, the polymer should permit subsequent cure and bonding of additional layers, e.g., multiple layers of the same thermally conducting gap filler.

The viscosity of the thermally conductive gap filler as well as the component materials (when prepared from multiple component systems) should be chosen based upon the manufacturing needs. In general, a lower viscosity of the thermally conductive gap filler material (precursor and/or the material itself), when in its not yet fully cured, may aid the manufacturing process. Flow of the composition during assembly can allow it to adjust to dimensional variations before being cured. In some embodiments, the composition of the present disclosure can exhibit shear thinning behavior in its uncured state. This can assist in the uniform application of the gap filler by, e.g., spray, jet, or roll coating. This rheological behavior may aid in allowing the gap filler to be applied using conventional robotic techniques. Shear thinning may also aid in easing the positioning of the individual battery cells by allowing easier movement while still holding the cells in place before final cure is achieved.

The composition of the present disclosure provides a good balance of the desired properties. Generally, the composition has both the desired uncured rheological properties as well as the desired cured mechanical and thermal properties, while allowing the necessary filler loadings to achieve adequate thermal conductivity.

Thermal management plays an important role in many electronics applications. For example, proper thermal management of battery assemblies contributes to addressing challenges in performance, reliability and safety. This includes both first level thermal management where battery cells are assembled in a battery module, and second level thermal management where these modules are assembled into battery subunits or battery systems. Thermal management can also be important in the cooling of battery control units, as well as in non-battery electronic applications.

Components of an example of a battery module of the present disclosure using a composition of the present disclosure are shown in FIG. 1. Battery module 50 is formed by positioning a battery cell 10 on first base plate 20. Generally, any known battery cell may be used (e.g., hard case prismatic cells or pouch cells). The number, dimensions, and positions of the cells associated with a battery module may be adjusted to meet specific design and performance requirements. The constructions and designs of the base plate are well-known, and any base plate (typically metal base plates) suitable for the intended application may be used.

Battery cell 10 is connected to first base plate 20 through a first thermally conductive gap filler 30 comprising the composition of the present disclosure as described herein in any of its embodiments. First thermally conductive gap filler 30 provides first level thermal management where the battery cells are assembled in a battery module. A voltage difference (e.g., a voltage difference of up to 2.3 Volts) is possible between the battery cells and the first base plate. Therefore, in some embodiments, electrically insulating fillers like ceramics (typically alumina and boron nitride) may be useful in the first thermally conductive gap filler 30.

The first thermally conductive gap filler 30 may be formed as a coating covering all, substantially all, or at least a portion of the first surface 22 of the first base plate 20. Alternatively or additionally, the first thermally conductive gap filler 30 may be applied directly to the battery cells and then mounted to the first surface 22 of the first base plate 20. In some embodiments, a pattern of thermally conductive gap filler 30 corresponding to the desired lay-out of multiple battery cells may be applied (e.g., robotically applied) to the surface of the base plate 20. A variety of coating techniques may be useful for applying the thermally conductive gap filler 30, for example, spray, jet, or roll coating.

During the assembly of the battery module 50 illustrated in FIG. 1 and before the first thermally conductive gap filler 30 is fully cured, individual battery cells may be positioned and repositioned as needed to achieve the desired layout. The rheological behavior of the not-fully-cured thermally conductive gap filler 30 aids in allowing the gap filler to flow and accommodate the dimensional variations (tolerances) within and between individual battery cells. In some embodiments, the thermally conductive gap filler 30 may need to accommodate dimensional variations of the battery cell 10 and/or the base plate 20 of up to 2 mm, up to 4 mm, or even more. Therefore, in some embodiments, the first thermally conductive gap filler 30 is at least 0.05 mm thick, in some embodiments, at least 0.1 mm, or at least 0.5 mm thick. Higher breakthrough voltages may require a thicker gap filler, depending on the electrical properties of the gap filler. In some embodiments, the thermally conductive gap filler is at least 1 mm, at least 2 mm, at least 3 mm, at least 4 mm, or at least 5 mm thick. Generally, to maximize heat conduction through the gap filler and to minimize cost, the thermally conductive gap filler 30 should be as thin as possible, while still ensuring good (thermal) contact with first base plate 20. Therefore, in some embodiments, the first thermally conductive gap filler 30 is no greater than 6 mm thick, e.g., no greater than 5 mm thick, or no greater than 3 mm thick.

As shown in FIG. 2, a plurality of battery modules 50, such as those illustrated and described in FIG. 1, are assembled to form battery subunit 100. Individual battery modules 50 are positioned on and connected to second base plate 120 through a second thermally conductive gap filler 130, which may comprise a composition of the present disclosure. The number, dimensions, and positions of the battery modules 50 associated with a particular battery subunit 100 may be adjusted to meet specific design and performance requirements. As shown in FIG. 2, additional elements, such as bands 40 may be used to secure the cells for transport and further handling. The constructions and designs of the second base plate 120 are well-known, and any base plate (typically metal base plates) suitable for the intended application may be used.

Second thermally conductive gap filler 130 is positioned between second surface 24 of first base plate 20 and first surface 122 of second base plate 120. The second thermally conductive gap filler 130 provides second level thermal management where the battery modules are assembled into battery subunits. At this level, breakthrough voltage may not be a requirement. Therefore, in some embodiments, electrically conductive fillers such as graphite and metallic fillers may be used, alone or in combination with non-electrically conductive fillers like ceramics.

The second thermally conductive gap filler 130 may be formed as a coating covering all, substantially all, or at least a portion of first surface 122 of second base plate 120, as shown in FIG. 2. Alternatively or additionally, the second thermally conductive gap filler 130 may be applied directly to the second surface 24 of first base plate 20, which are then mounted to the first surface 122 of the first base plate 120. In some embodiments, a pattern of thermally conductive gap filler 30 corresponding to the desired lay-out of multiple battery cells 10 may be applied (e.g., robotically applied) to the first surface 22 of the first base plate 20, and/or a pattern of thermally conductive gap filler 130 corresponding to the desired lay-out of the battery modules 50 may be applied (e.g., robotically applied) to the first surface 122 of the second base plate 120. The coating techniques and thicknesses described above in connection with the preparation of a battery module 50 are also applicable in the assembly of a battery subunit 100.

The assembled battery subunits may be combined to form further structures. For example, as is known, battery modules may be combined with other elements such as battery control units to form a battery system, e.g., battery systems used in electric vehicles. Additional thermally conductive gap filler comprising the composition of the present disclosure may be used in the assembly of such battery systems. For example, the composition of the present disclosure may be used to mount and help cool the battery control unit.

Polymer networks according to the present disclosure can be useful as sealants, for example, aviation fuel resistant sealants. Aviation fuel resistant sealants are widely used by the aircraft industry for many purposes. Commercial and military aircraft are typically built by connecting a number of structural members, such as longitudinal stringers and circular frames. The aircraft skin, whether metal or composite, is attached to the outside of the stringers using a variety of fasteners and adhesives. These structures often include gaps along the seams, joints between the rigidly interconnected components, and overlapping portions of the exterior aircraft skin. The composition according to the present disclosure can be useful, for example, for sealing such seams, joints, and overlapping portions of the aircraft skin. The composition may be applied, for example, to aircraft fasteners, windows, access panels, and fuselage protrusions. As a sealant, the composition disclosed herein may prevent the ingress of weather and may provide a smooth transition between the outer surfaces to achieve desired aerodynamic properties. The composition according to the present disclosure may likewise be applied to interior assemblies to prevent corrosion, to contain the various fluids and fuels necessary to the operation of an aircraft, and to allow the interior of the aircraft (e.g., the passenger cabin) to maintain pressurization at higher altitudes. Among these uses are the sealing of integral fuel tanks and cavities.

Aircraft exterior and interior surfaces, to which sealants may be applied, may include metals such as titanium, stainless steel, and aluminum, and/or composites, any of which may be anodized, primed, organic-coated or chromate-coated. For example, a dilute solution of one or more phenolic resins, organo-functional silanes, titanates or zirconantes, and a surfactant or wetting agent dissolved in organic solvent or water may be applied to an exterior or interior surface and dried.

Sealants may optionally be used in combination with a seal cap, for example, over rivets, bolts, or other types of fasteners. A seal cap may be made using a seal cap mold, filled with a curable sealant, and placed over a fastener. The curable sealant may then be cured. In some embodiments, the seal cap and the curable sealant may be made from the same material. In some embodiments, the seal cap may be made from a curable composition disclosed herein. For more details regarding seal caps, see, for example, Int. Pat. App. Pub. No. WO2014/172305 (Zook et al.).

In some embodiments, compositions according to the present disclosure may be useful in these applications, for example, because of their fuel resistance and low glass transition temperatures. In some embodiments, the polymer network according to the present disclosure has a low glass transition temperature, in some embodiments less than −20° C., in some embodiments less than −30° C., in some embodiments less than −40° C., and in some embodiments less than −50° C. In some embodiments, the polymer network according to the present disclosure has high jet fuel resistance, characterized by a volume swell of less than 30% and a weight gain of less than 20% when measured according to Society of Automotive Engineers (SAE) International Standard AS5127/1.

In some embodiments, the composition according to the present disclosure exhibits at least one of a non-tacky surface or a 30 Shore "A" hardness after curing for less than 24 hours, in some embodiments, less than 12 hours or 10 hours under ambient conditions. In some embodiments, the compositions according to the present disclosure can achieve a 45 to 50 Shore "A" hardness in up to 2 weeks, up to 1 week, up to 5 days, up to 3 days, or up to 1 day.

In order that this disclosure can be more fully understood, the following examples are set forth. It should be understood that these examples are for illustrative purposes only and are not to be construed as limiting this disclosure in any manner.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

Materials List

| DESIGNATION | DESCRIPTION | SOURCE |
|---|---|---|
| THIO-LP32M | Liquid polysulfide polymer obtained under the trade designation THIOKOL LP32M | Toray Industries Inc., Tokyo, Japan |
| THIO-LP12M | Liquid polysulfide polymer obtained under the trade designation THIOKOL LP12M | Toray Industries Inc., Tokyo, Japan |
| THIO-FLEP 60 | Epoxy terminated liquid polysulfide polymer obtained under the trade designation THIOKOL FLEP 60 | Toray Industries Inc., Tokyo, Japan |
| THIO-LP-0010-BL | Liquid polysulfide polymer obtained under the trade designation THIOKOL LP-0010-BL | Toray Industries Inc., Tokyo, Japan |
| THIO-LP-55 | Liquid polysulfide polymer obtained under the trade designation THIOKOL LP-55 | Toray Industries Inc., Tokyo, Japan |
| THIO-LP-33 | Liquid polysulfide polymer obtained under the trade designation THIOKOL LP-33 | Toray Industries Inc., Tokyo, Japan |
| THIO-LP-3 | Liquid polysulfide polymer obtained under the trade designation THIOKOL LP-3 | Toray Industries Inc., Tokyo Japan |
| EPON 828 | Difunctional Bis A epoxy obtained under the trade designation EPON 828 | Momentive, Waterford, NY |
| TMPMP | Trimethylolpropanetri (3-mercaptopropionate) | Evans Chemetics, Taeneck, NJ |
| $CaCO_3$ | Calcium carbonate | Sigma-Aldrich Co. |
| Fumed silica | Pyrogenic silica obtained under the trade designation HDK H18 | Wacker Chemie AG, Munich, Germany |
| DMAPM | N-[3-(Dimethylamino)propyl]methacrylamide | Sigma-Aldrich Co. |
| Caprolactone acrylate | Caprolactone acrylate obtained under the trade designation SR 495B | Arkema, Colombes, France |
| IRG-819 | Photoinitiator obtained under the trade designation CIBA IRGACURE 819 | BASF, Ludwigshafen, Germany |
| Glycerol | Glycerol, $C_3H_8O_3$ | Sigma-Aldrich Co. |
| MX-257 in EPON 828 | A diglycidyl ether of bisphenol-A epoxy resin containing 37.5 wt. % butadiene-acrylic co-polymer core shell rubber having an approximate epoxy equivalent available under the trade designation "KANE ACE MX 257" mixed with EPON 828 | Kaneka Texas Corporation, Pasadena, TX. United States |
| DISPERBYK 145 | Phosphoric ester salt available under the trade designation "DISPERBYK 145" | BYK (part of Altana Group) of Wessel, Germany |
| BAK-70 | Spherical alumina available under the designation "BAK-70" | Shanghai Bestry Performance Materials Co., Ltd. of Pudong, Shanghai. China |
| BAK-10 | Spherical alumina available under the designation "BAK-10" | Shanghai Bestry Performance Materials Co., Ltd. of Pudong, Shanghai. China |
| TM1250 | Thermally conductive alumina filler available under the trade designation MARTOXID TM1250 | Huber Engineered Materials of Atlanta, GA. United States |

Test Methods

GPC samples were analyzed by conventional GPC against polystyrene molecular weight standards. The samples were prepared in tetrahydrofuran (THF) modified with 1% triethylamine (TEA). This modified THF was also used as the mobile phase in the GPC analysis. The addition of the TEA was needed to interrupt the interactions between the sample (amine groups) and the column.

The samples were prepared as single preparations at concentration of 3 milligrams per milliliter (mg/mL) in THF modified with 1% TEA. The samples were allowed to dissolve overnight on an orbital shaker, were filtered through a 0.45 micrometer (μm) PTFE syringe filter, and analyzed by GPC.

GPC conditions:

| | |
|---|---|
| Instrument | Agilent 1260 |
| Column set | Agilent PLGel Mixed E, (300 × 7.5 mm ID). |
| Col Heater | 40° C. |
| Eluent | THF w/ 1% TEA at 1.0 mL/min |
| Injection | 30 μL |
| Detector | Differential refractive index |

The molecular weight calculations were based upon a calibration made of narrow dispersity polystyrene (PS) molecular weight standards ranging in molecular weight from $2.78 \times 10^4$ to 168 g/mol. The calculations were performed using Agilent GPC/SEC software from Agilent Technologies.

EXAMPLES

Slow Acting Dispersion Catalyst (SACD) Preparation: Examples A to C (Ex-A to Ex-C)

For EX-A: DMAPM, caprolactone acrylate, and IRG-819 were combined according to the amounts listed in Table 2 and stirred at room temperature away from ambient light until dissolved. THIO-LP32M and THIO-LP12M were separately combined (according to Table 2) and mixed for 10 minutes. The DMAPM, caprolactone acrylate, and IRG-819 mixture was then added to the THIO-LP32M and THIO-LP12M and was vigorously blended with a propeller blade for 5 minutes at about 1500 revolutions per minute (RPM). The SACD dispersion was then proud into a ZIPLOC bag and exposed to UV light (460 nanometers (nm)) for 10 minutes.

For EX-B: DMAPM, caprolactone acrylate, and IRG-819 were combined according to the amounts listed in Table 2 and stirred at room temperature away from ambient light until dissolved. Glycerol was then added to the mixture (according to Table 2) and was vigorously blended with a propeller blade for 5 minutes at about 1500 revolutions per minute (RPM). The SACD dispersion was then proud into a ZIPLOC bag and exposed to UV light (460 nanometers (nm)) for 10 minutes.

For EX-C: DMAPM, caprolactone acrylate, and IRG-819 were combined according to the amounts listed in Table 2 and stirred at room temperature away from ambient light until dissolved. THIO-LP3 was then added to the mixture (according to Table 2) and was vigorously blended with a propeller blade for 5 minutes at about 1500 revolutions per minute (RPM). The SACD dispersion was then proud into a ZIPLOC bag and exposed to UV light (460 nanometers (nm)) for 10 minutes.

TABLE 2

| Formulation for SACD Dispersion | | | | | | | |
|---|---|---|---|---|---|---|---|
| EXAMPLE | DMAPM, g | Caprolactone acrylate, g | IRG-819, mg | THIO-LP32M, g | THIO-LP12M, g | THIO-LP3 | Glycerol, g |
| EX-A | 90 | 10 | 300 | 100 | 100 | 0 | 0 |
| EX-B | 20 | 20 | 300 | 0 | 0 | 0 | 150 |
| EX-C | 20 | 20 | 300 | 0 | 0 | 150 | 0 |

Examples 2 to 4 (Ex-2 to Ex-4)

To prepare EX-2 to EX-4, combine the components as listed in Table 3 and shear blend to mix thoroughly. Formulations were transferred to a jar and left to sit on the benchtop at room temperature. Contents were stirred with a wooden stick to determine cure time.

TABLE 3

| Formulations | | | | | | |
|---|---|---|---|---|---|---|
| EXAMPLE | EX-A, g (wt %) | THIO-FLEP 60, g (wt %) | THIO-LP32M, g (wt %) | THIO-LP12M, g (wt %) | THIO-LP-0010-BL, g (wt %) | $CaCO_3$, g (wt %) |
| EX-2 | 0.8 (11.76) | 1.2 (17.65) | 0.8 (11.76) | 2 (29.41) | 1 (14.71) | 1 (14.71) |
| EX-3 | 0.5 (7.58) | 1.2 (18.18) | 0.8 (12.12) | 2.1 (31.82) | 1 (15.15) | 1 (15.15) |
| EX-4 | 0.31 (4.68) | 1.21 (18.25) | 0.87 (13.12) | 2.24 (33.79) | 1 (15.08) | 1 (15.08) |

TABLE 4

| Curing Properties | | | |
|---|---|---|---|
| EXAMPLE | OPEN TIME | MATERIAL IS SET YET STILL DIMPLES | FULLY CURED |
| EX-2 | 68 minutes | 120 minutes | 3 hours |
| EX-3 | 78 minutes | 120 minutes | 3 hours |
| EX-4 | 100 minutes | 2 hours 40 minutes | 3 hours |

Examples 5 to 7 (Ex-5 to E-7)

A base formulation (BF-1) was prepared using steps 1 to 5.

Step 1: THIOKOL LP-3, EPON 828, MX-257 in EPON 828 and DISPERBYK 145 were mixed together with a SPEEDMIXER DAC 400 VAC from FlackTek, Inc. of Landrum, SC. USA at 2000 rpm for two minutes in weight percentages as indicated in Table 5.

Step 2: TM1250 in weight percent, as indicated in Table 5, was added to the Step 1 mixture and mixed with the SPEEDMIXER DAC 400 VAC at 2000 rpm for two minutes to ensure proper dispersion.

Step 3: BAK10 in weight percent, as indicated in Table 5, was divided into two equal portions. A first portion of the BAK10 was added to the Step 2 mixture and mixed with the SPEEDMIXER DAC 400 VAC at 2000 rpm for two minutes to ensure proper dispersion. The second portion of the BAK10 was then added to the mixture and mixed with the SPEEDMIXER DAC 400 VAC at 2000 rpm for two minutes.

Step 4: BAK70 in weight percent, as indicated in Table 5, was divided into three equal portions. A first portion of the BAK70 was added to the Step 3 mixture and mixed with the SPEEDMIXER DAC 400 VAC at 2000 rpm for two minutes to ensure proper dispersion. The second portion of the BAK70 was then added to the mixture and mixed with the SPEEDMIXER DAC 400 VAC at 2000 rpm for two minutes. The third portion of the BAK70 was then added to the mixture and mixed with the SPEEDMIXER DAC 400 VAC at 2000 rpm for two minutes.

Step 5: The Step 4 mixture was degassed at 40 torr for 1 minute using the SPEEDMIXER DAC 400 VAC.

Step 6: The base formulation (BF-1) was them mixed with EX-A according to Table 6. A wooden rod was inserted into the sample at 5-minute time intervals. The time at which the formulation became too thick and could not be freely mixed with the wooden rod was noted as open time and the time at which the wooden rod was not able to penetrate through the surface of the formulation was noted as cure time.

The resulting sample films were cast between glass plates and were cured in an oven for 12 hours at 90° C. (194° F.).

TABLE 5

| Formulations (weight percent) | | | | | | | |
|---|---|---|---|---|---|---|---|
| EXAMPLE | LP3 | EPON 828 | MX-257 in EPON-828 | DISPERBYK 145 | BAK-70 | BAK-10 | TM1250 |
| BF-1 | 21.0 | 5.67 | 3.09 | 0.35 | 42 | 14 | 14 |

TABLE 6

| Formulations | | |
|---|---|---|
| EXAMPLE | BF-1, g (wt %) | EX-A, g (wt %) |
| EX-5 | 5 (83.33) | 1 (16.67) |
| EX-6 | 5 (90.91) | 0.5 (9.09) |
| EX-7 | 5 (94.34) | 0.3 (5.66) |

TABLE 7

| Gel and Cure Time Performance | | |
|---|---|---|
| EXAMPLE CURED | OPEN TIME | COMPLETELY |
| EX-5 | 48 minutes | 55 minutes |
| EX-6 | 60 minutes | 2.5 hours |
| EX-7 | 70 minutes | 3 hours |

Example 8 (Ex-8)

A sample of 50:50 caprolactone acrylate/DMAPM in 50:50 THIO-LP-33/THIO-LP-55 at a ratio of 20:80 caprolactone acrylate/DMAPM to THIO-LP-33/THIO-LP-55 was prepared for GPC analysis according to the test method above. GPC results are reported in Table 8.

TABLE 8

| GPC Analysis | | | |
|---|---|---|---|
| EXAMPLE | $M_n$, g/mol | $M_w$, g/mol | PDI* |
| EX-8 | 730 | 3500 | 4.79 |

*Polydispersity index ($M_w/M_n$)

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:

an amine-reactive material, wherein the amine-reactive material comprises at least two epoxy groups; and a polymeric catalyst comprising hydroxyl groups and tertiary amine groups suspended or dispersed in a thiol-functional liquid dispersant, wherein the polymeric catalyst is utilized in an amount up to 5 wt. % of the total weight of the composition; wherein the polymeric catalyst consists of the reaction product of a) at least one hydroxyl-functional ethylenically unsaturated monomer having the general formula $$HOQ_1(A)p$$

wherein $Q_1$ is a polyvalent hydrocarbon linking group optionally include oxygen, sulfur, carbonyl sulfonyl, or combinations thereof;

A has the formula —XC(═O)C($R_1$)═$CH_2$ wherein X is oxygen or $NR_2$, and $R_1$ and $R_2$ are independently hydrogen or $C_1$-$C_4$ alkyl; and p ranges from 1 to 2;

b) at least one ethylenically unsaturated monomer comprising a tertiary amine group has the general formula $R_3Q_2(A)p$ wherein $Q_2$ is a polyvalent alkylene linking group;

A has the formula $—XC(=O)C(R_1)=CH_2$ wherein X is oxygen or $NR_2$, and $R_1$ and $R_2$ are independently hydrogen or $C_1$-$C_4$ alkyl;

$R_3$ is a tertiary amine; and p ranges from 1 to 2.

2. The composition of claim 1 wherein the liquid dispersant does not covalently bond with the tertiary amine groups.

3. The composition of claim 1 wherein $Q_1$ is alkylene comprising 1 to 26 carbon atoms.

4. The composition of claim 1 wherein $Q_2$ is alkylene comprising 1 to 26 carbon atoms.

5. The composition of claim 1 wherein the polymeric catalyst comprises 1-5 mol. % of tertiary amine groups.

6. The composition of claim 1 wherein the polymeric catalyst comprises at least one hydroxyl group per polymer chain.

7. The composition of claim 1 wherein the amine-reactive material is a polyepoxide.

8. The composition of claim 7 wherein the polyepoxide is an epoxy-functional polythiol, epoxy resin, or combination thereof.

9. The composition of claim 8 wherein the composition further comprises a polythiol lacking epoxy functionality.

10. The composition of claim 1 wherein the composition further comprises at least one filler and/or toughening agent.

11. The composition of claim 1 packaged as a two-part composition, wherein a first part comprises the liquid dispersant and polymeric catalyst, and a second part comprising an amine reactive material.

12. A method of making a polymer network, the method comprising:

applying the composition of claim 1 to a surface; and allowing the composition to cure at room temperature on the surface to provide the polymer network.

* * * * *